April 17, 1934.   C. H. SMOOT   1,954,850
REMOTE INDICATOR OR REGULATOR
Filed March 15, 1929
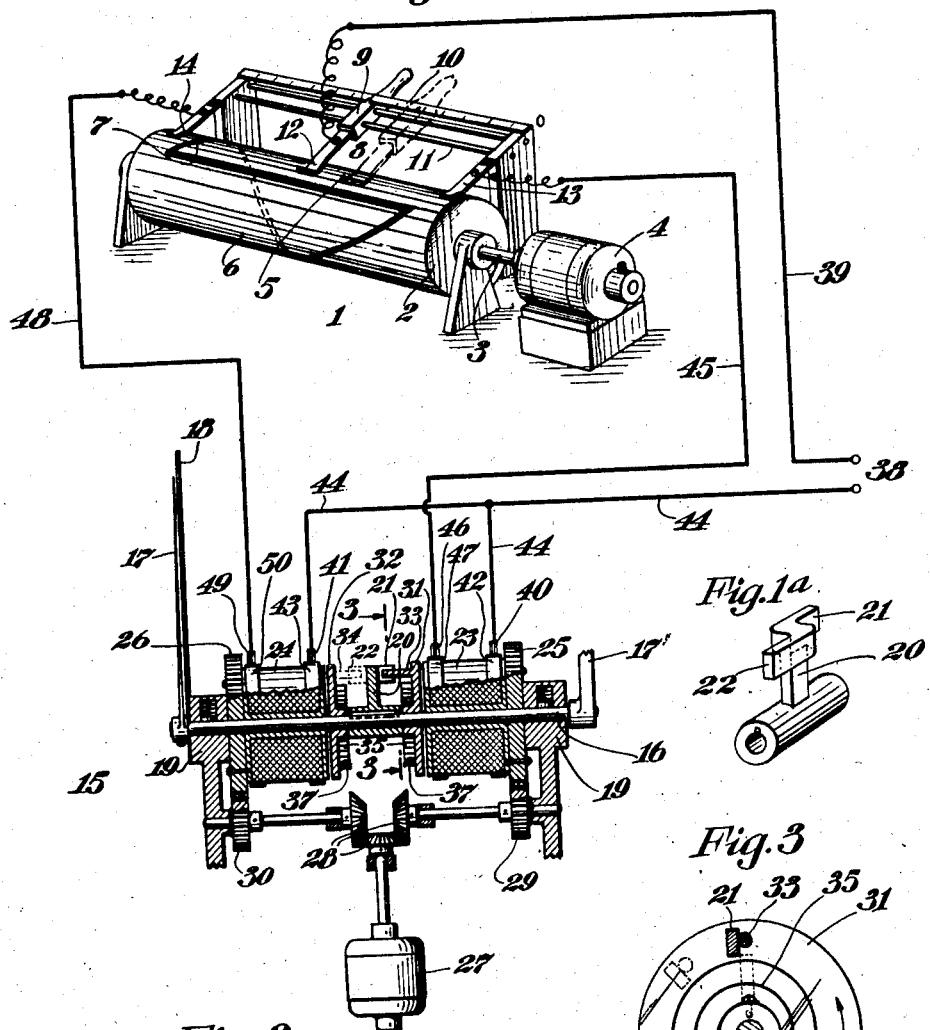
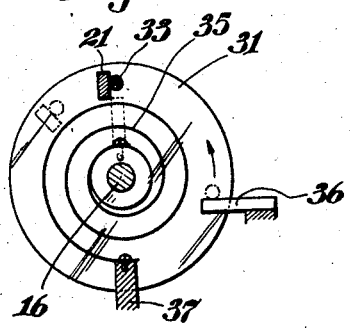
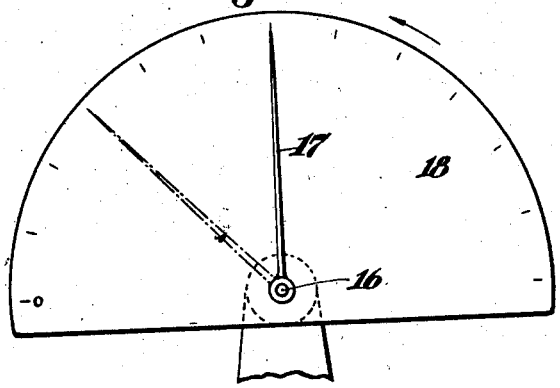
INVENTOR
Charles H. Smoot,
BY
ATTORNEYS Patented Apr. 17, 1934

1,954,850

UNITED STATES PATENT OFFICE 1,954,850

REMOTE INDICATOR OR REGULATOR

Charles H. Smoot, Maplewood, N. J., Katherine Smoot, executrix of said Charles H. Smoot, deceased Application March 15, 1929, Serial No. 347,254

6 Claims. (Cl. 177—337)

REISSUED

My invention comprises novel remote indicating or regulating apparatus which may be used to cause one or a plurality of indicators or regulators at remote points to move either exactly with, or in some definite relation to, the movement of an indicator or regulator at another point. My invention comprises apparatus for this purpose, that is, rugged and of simple construction and capable of causing movement of relatively heavy indicating or regulating members without sacrificing accuracy. My invention is primarily directed to novel mechanical and electrical apparatus, including a transmitting device, and one or a plurality of receiving devices, and as such is not concerned with any one of the particular uses for which such apparatus may be advantageously employed. In the interest of clarity, however, I will describe my invention as applied to the indication at one point of the position of a member at a remote point, it being understood of course, that this is by way of illustration only.

For a better understanding of the novel features of my invention, reference should be had to the accompanying drawing, of which:

Fig. 1 is a view partly in section of one modification of my invention,

Fig. 1a is an enlarged view in perspective of a detail of Fig. 1,

Fig. 2 is a view of the indicating device at the receiving station, and

Fig. 3 is an enlarged sectional view on the line 3—3 of Fig. 1.

Referring to the drawing a transmitting device 1 comprises a drum 2 mounted on a suitably journaled shaft 3 of a motor 4 for driving the drum at a constant speed. The cylindrical surface of the drum is of electrical conducting material divided into two parts 5 and 6, electrically insulated from each other by a band 7 of insulating material. A movable member 8, comprising in the modification illustrated, a body 9 adapted to be positioned manually with respect to a scale 10 by sliding along support bars 11, carries an electrical contact 12 in sliding engagement with the surface of drum 2. Contact 12 is thus alternately connected with parts 5 and 6 for periods of time depending both upon the manner in which band 7 divides the surface of the drum, and upon the longitudinal position of member 8 with respect to the drum. Stationary contacts 13 and 14 in sliding engagement with parts 5 and 6 respectively, are mounted at either end of the drum and are electrically insulated from each other and from contact 12.

A receiving device 15, located at some point remote from the device 1 comprises a movable shaft 16 carrying in this instance a needle 17 adapted to move over a scale 18 to indicate thereupon a position corresponding to the position of member 8 along the scale 10 of the transmitting device. The shaft 16 is suitably journaled in fixed bearings 19, and has keyed thereon a member 20 having projecting portions 21 and 22, (see Fig. 1a). Rotatably mounted upon shaft 16 are two electromagnets 23 and 24 mounted on gears 25 and 26 respectively, which are rotated upon the shaft in opposite directions by suitable gearing to a motor 27. As shown, the gearing comprises bevel gears 28 and pinions 29 and 30 coacting with gears 25 and 26 respectively. Armatures 31 and 32 also rotatably mounted on shaft 16 are respectively associated with electromagnets 23 and 24 and are rotated when attracted to their respective electromagnets by energization thereof. Armature 31, when rotated, brings a finger 33 which is carried by the armature, into engagement with the projection 21 on the member 20 and serves to turn shaft 16 in the direction of the arrow in Figs. 2 and 3. Similarly a finger 34 on armature 32 engages projection 22 to turn shaft 16 in the opposite direction when electromagnet 24 is energized. Coiled springs 35 maintain armatures 31 and 32 with their respective fingers 33 and 34 held against fixed stops 36 during deenergization of the respective electromagnets. The springs 35 are each attached at one end to stationary parts 37 and at the other end to hub portions of the respective armatures.

Any suitable source of electromotive force is indicated in Fig. 1 by the terminals 38. One of the terminals 38 is connected by lead wire 39 to sliding contact 12 of device 1 and the other terminal is connected by connector 44 to brushes 40 and 41 in sliding contact respectively with terminal rings 42 and 43 of electromagnets 23 and 24 respectively. A lead wire 45 connects contact 13 with a brush 46 in contact with the other terminal ring 47 of electromagnet 23 and similarly a wire 48 connects contact 14 with brush 49 in contact with the other terminal ring 50 of electromagnet 24.

Motors 4 and 27 may be any suitable type of electric motors and are preferably operated synchronously.

In operation when member 8 is in the position shown, with its contact 12 in engagement with substantially the midportion of the drum, and when band 7 divides the surface of the drum into two symmetrical equal parts, as shown, then contact 12 is alternately electrically connected to contacts 13 and 14 for equal periods of time, each corresponding to a half-rotation of drum 2. Electromagnets 23 and 24 are thus alternately energized for equal periods of time, magnet 23 being energized when contact 12 engages part 5, and magnet 24 being energized when contact 12 engages part 6. Energization of magnet 23 causes armature 31 to be attracted thereto and to rotate in the direction of the arrow in Fig. 3. Preferably the gearing to motor 27, and the relative speeds of motors 4 and 27 are so designed as to cause an angular rotation of 90° of armatures 31 and 32 to occur when contact 12 engages parts 5 and 6 respectively for equal periods of time. During each such rotation armatures 31 and 32 are turned sufficiently against the tension of the respective springs 35 as to bring fingers 33 and 34 to the upper central position indicated in Fig. 1 in full lines for finger 33 and in dotted lines for finger 34. During the alternate periods of deenergization of magnets 23 and 24, the springs 35 return the armatures to the position where their respective fingers rest against stops 36. Member 20, if not already in the vertical position illustrated, is thus rotated by one or the other of fingers 33 or 34 to such position. Needle 17 is thus brought to the central position on scale 18 and indicates thereupon that member 8 of the transmitting device is at the central position along scale 10. If now, member 8 is shifted along scale 10 to the right to the position indicated in dotted lines in Fig. 1, magnet 23 will be energized during three quarters of each revolution of drum 2 and magnet 24 will be energized during the remaining quarter revolution. Armature 31 will therefore be rotated through 135° and armature 32 through only 45° with the result that member 20 will be shifted by finger 33 to turn shaft 16 through 45°, and needle 17 will correspondingly be shifted to the position indicated in dotted lines in Fig. 2. Conversely a shift of member 8 to the left in Fig. 1 will cause magnet 24 to be energized for relatively longer periods of time than magnet 23 and consequently finger 34 will turn shaft 16 by engagement with projection 22 by such an amount as to cause needle 17 to take up a position upon scale 18 so as to correspond with the position of member 8 along scale 10.

From the above description it will be apparent that for each shift of member 8, only one or the other of fingers 33 and 34 effect the actual rotation of shaft 16 by engagement with one of the projections on member 20; the other finger merely approaching engagement with member 20 and then being immediately retracted therefrom by spring 35. To insure no over travel of shaft 16 and consequent vibration of needle 17, frictional means, such as spring pressed bearings, are provided.

My apparatus is not limited to the duplication of the movement of member 8 by needle 17 but may be readily arranged, by varying the shape of parts 5 and 6, to maintain any desired relation between the two movements. For example, the insulating band 7 might be so positioned on the surface of drum 2 as to cause the end of needle 17 to shift a distance along scale 18 corresponding to the square root of the distance through which member 8 has been moved along scale 10. This would be of advantage in the case where member 9 was moved automatically in response to the square of a variable function, such as electric current, and it was desired to indicate the linear variations of the function upon scale 18.

Where indications are desired at a number of different stations, a plurality of devices 15, one located at each of the stations, are connected with their corresponding magnets in parallel. Where it is desired to effect a control at the receiving end, instead of, or in addition to, the indicating function of device 15, it is only necessary to utilize the rotation of shaft 16 to position a damper, valve, etc., or in the case where the well known type of balanced regulator is employed, to vary the controlling force upon the regulator balance lever. In Fig. 1 I have indicated at 17' an arm mounted on shaft 16 to which may be connected the regulator or other element to be controlled by the movement of shaft 16 when using the device 15 as a regulator.

If, instead of regulation or synchronous indication at a remote point, it was only desired to know the maximum position to which member 8 had been moved during a certain period, electromagnet 23 and its associated parts could be removed, and, conversely, if knowledge of the minimum position only was desired, magnet 24 and associated parts could be removed.

I have now described my invention and indicated some of the many uses for which it may advantageously be employed. I do not wish to be limited, beyond the scope of my appended claims to the particular arrangement described as obviously variations in part thereof could readily be made without departing from the spirit of my invention.

I claim:

1. In apparatus of the class described, the combination comprising a control member, a controlled member movable throughout a predetermined range, an actuating device in the path of movement of said controlled member and operable to move the same in one direction, a second actuating device in the path of movement in said controlled member and operable to move the same in the other direction, means associated with each of said devices normally biasing said devices to opposite ends of the range of said controlled member, continuously operating driving means, and means for alternately coupling the driving means with each of said actuating devices to drive the same against their respective bias for periods of time depending upon the position of said control member.

2. The combination according to claim 1 wherein said last mentioned means include a continuously rotating drum having its surface divided into two electrically conducting mutually insulated parts, an electrical contact movable by said control member longitudinally along said drum and in contact with the surface thereof, a source of electrical energy connected to said contact and electromagnetic means so connected with said source and with said insulated parts as to couple one of said actuating devices to the driving means when said contact engages one of said insulated parts and to couple the other of said actuating devices to the driving means when said contact engages the other of said parts.

3. In apparatus of the class described, a control member, a controlled member movable in either direction throughout a predetermined range, an actuating device operable to engage and move said controlled member throughout said range in one direction only and biased toward disengaging position, a second actuating device operable to engage and move said controlled member throughout said range in the opposite direction only and biased toward disengaging position and means for alternately driving said devices away from their respective biased positions through distances each of which depends upon the position of said control member, and the sum of which is constant.

4. In apparatus of the class described, a shaft rotatable in either direction through a predetermined range, a device rotatably mounted on said shaft and biased toward one end of said range, a second device rotatably mounted on said shaft and biased toward the other end of said range, a member carried by said shaft and having projections extending into the path of travel of said devices, means for alternately rotating said devices away from their respective biased position and toward engaging position with said member through angles the sum of which is equal to the total predetermined angular range of movement of said shaft, a movable control member remote from said shaft and means controlled by the position of said control member for determining the angular motion of said devices.

5. In apparatus of the class described a source of power and a cylindrical drum continuously driven thereby, the surface of said drum being of electrically conducting material and divided into two mutually insulated parts, a control member movable longitudinally along said drum and provided with an electrical contact adapted to alternately engage varying proportions of each part at different positions of said movable member, a controlled member remote from said control member, driving means adapted to drive said controlled member in either direction, and electromagnetic means in electrical communication with said parts for coupling said controlled member to said driving means when said contact engages one of said parts to drive said controlled member in one direction upon movement of said control member in one direction, and for coupling said controlled member to said driving means when said contact engages the other of said parts to drive said controlled member in the other direction upon movement of said control member in the other direction.

6. In apparatus of the class described a controlled element adapted to be positioned throughout a predetermined range from a minimum to a maximum position, a member biased toward minimum position and adapted to move said controlled element toward maximum position by engagement therewith, a member biased toward maximum position and adapted to move said controlled element to minimum position by engagement therewith, means for alternately driving said members against their respective bias at uniform speed for periods of time which vary but whose sum is constant whereby said controlled element will be positioned in accordance with the periods of time during which said members are driven.

CHARLES H. SMOOT.